United States Patent [19]

Notermann

[11] 4,269,736

[45] May 26, 1981

[54] PARAFIN CONVERSION CATALYST

[75] Inventor: Thomas M. Notermann, South Charlston, W. Va.

[73] Assignee: Norton Company, Worcester, Mass.

[21] Appl. No.: 93,976

[22] Filed: Nov. 14, 1979

[51] Int. Cl.³ .............................................. B01J 29/22
[52] U.S. Cl. .................................................. 252/455 Z
[58] Field of Search .................................... 252/455 Z

[56] References Cited

U.S. PATENT DOCUMENTS

| | | | |
|---|---|---|---|
| 3,200,083 | 8/1965 | Milton | 252/455 Z |
| 3,257,310 | 6/1966 | Plank et al. | 252/455 Z |
| 3,326,818 | 6/1967 | Gladrow et al. | 252/455 Z |
| 3,354,077 | 11/1967 | Hansford | 252/455 Z |
| 3,360,484 | 12/1967 | Laurent | 252/455 Z |

*Primary Examiner*—Carl F. Dees
*Attorney, Agent, or Firm*—Rufus M. Franklin; Frank S. Chow

[57] ABSTRACT

Drying of noble metal loaded mordenite in a humid atmosphere form a hydrated complex of the noble metal results in better catalytic activity of the ultimate calcined and reduced catalyst.

5 Claims, No Drawings

PARAFIN CONVERSION CATALYST

FIELD OF THE INVENTION

The invention relates to the preparation of noble metal loaded molecular sieves.

BACKGROUND OF THE INVENTION

Catalytically active components can be introduced into zeolite cavities or on their crystal surface by ion exchange, impregnation, codeposition or adsorption from gaseous phase. Because of the nature of zeolites, ion exchange is often used to prepare metal containing zeolite catalysts. This method does not always provide a uniform distribution of small amounts of cations in the bulk of the catalyst. Improved distribution of metals was obtained by exchanging the noble metal cation, i.e. $Pd(NH_3)_4^{2+}$ in the presence of competing ions such as $NH_4^+$. U.S. Pat. No. 3,527,835 (Sept. 8, 1970).

A variety of volatile or soluble organic or inorganic compounds are used to load metals on zeolites by adsorption. Carbonyls or hydrocarbonyls (U.S. Pat. No. 3,013,987, U.S. Pat. No. 3,013,988, U.S. Pat. No. 3,013,990), acetylacetonates (U.S. Pat. No. 3,013,987, U.S. Pat. No. 3,013,990), halogenides (U.S. Pat. No. 3,013,987, U.S. Pat. No. 3,013,986), alkyl derivatives (U.S. Pat. No. 3,013,986), and pi allyl species (Kinet. Catal. 13, 1335 (1972)), can be used for this purpose.

Preparation by ion exchange generally involves metal amine complexes ($Pd(NH_3)_4^{2+}$) because the zeolite is in the ammonium form during ion exchange.

Since it is the metallic state ($Pd^0$) rather than the ionic state ($Pd^{2+}$) which is catalytically active, the metal loaded zeolite is heated to decompose the metal complex. Heating in hydrogen provides a less active catalyst. The unstable, neutral, and hence mobile hydride leads to agglomeration of Pt (Proc. 5th Intern. Congr. Catalysis, Miami Beach, 1972 (1973, 1, 329) as follows:

Prior art teaches that the best distribution of a metal in a molecular sieve can be achieved when water is removed from the zeolite before reduction (U.S. Pat. No. 3,013,982; Proc. 5th Intern. Congr. Catal. (1973) 1, 329). Additionally, teachings indicate that water molecules, which are bound to $Pd^{2+}$ cations, prevent their interaction with hydrogen and hence inhibit their reduction to the metallic state (Advan. Chem. Ser. 121, 66 (1973)). Accordingly, state of the art catalyst treatment after ion exchange is generally performed in a dry atmosphere.

SUMMARY OF INVENTION

The present invention involves a catalyst with improved performance for the conversion of hydrocarbons. The catalyst is comprised of a zeolite and one or more platinum group metals. Following incorporation of the platinum group metal(s) into the zeolite, the catalyst of the present invention is dried in a water vapor containing atmosphere at low temperatures in the presence of a mild organic acid. This catalyst is then calcined at 450°–600° C. in a dry air and reduced in hydrogen at temperatures from 200°–550° C.

EXAMPLE 1

Sodium Zeolon powder was repeatedly ion exchanged with 5.0 N ammonium nitrate aqueous solutions. This ammonium mordenite powder was bonded with 20 wt.% of boehmite using a formic acid solution. This material was pelletized into 1/16" pellets and dried at 110° C. in air substantially saturated with water for several hours. The initial white color of the material remained unchanged and no heat was evolved.

EXAMPLE 2

Ammonium mordenite powder, produced as described in Example 1, was refluxed three hours in 0.35 N nitric acid. The material was then palladium ion exchanged to 0.5 wt.% Pd uptake using a solution of Pd $(NH_3)_4^{2+}$. The resultant solid was bonded and pelletized as in Example 1, and then dried in an ammonia atmosphere at 110° C. for several hours. The initial light color of the material remained unchanged and no heat was evolved.

EXAMPLE 3

Palladium exchanged powder, produced and bonded as described in Example 2, was dried in air substantially saturated with water at 110° C. for several hours. The initial light color changed to a dark gray color. Heat evolved from the sample during pelletization.

EXAMPLE 4

The samples of Examples 2 and 3 were examined by infrared spectroscopy. The adsorption spectra of the Example 2 sample indicates that $Pd(NH_3)_4^{2+}$ species are present (absorption bands near 1400 cm$^{-1}$.) The absorption spectrum of the Example 3 sample is different from that of the Example 2 and thus demonostrates that the metal complex ($Pd(NH_3)_4^{2+}$) has changed as a result of drying in a water atmosphere.

EXAMPLE 5

Ammonium mordenite powder, produced as described in Example 1, was refluxed three hours in 0.35 N nitric acid. The material was ion exchanged to 0.20 wt.% Pd and 0.32 wt.% Rh uptake using a solution of $Pd(NH_3)_4^{2+}$ and $Rh(NH_3)_5^{3+}$. The resultant solid was bonded and pelletized as in Example 1, and then dried in an ammonia atmosphere at 110° C. for several hours. The initial light color of the material remained unchanged and no heat was evolved.

EXAMPLE 6

Palladium and rhodium exchanged powder, produced and bonded as described in Example 5, was dried in air substantially saturated with water at 110° C. for several hours. The initial light color changed to dark gray and tan colors. Heat evolved from the sample during pelletization. The tan color appeared at a slower rate than the dark gray color.

EXAMPLE 7

Palladium exchanged powder, produced as described in Example 2, was bonded with 20 wt.% of boehmite using a dilute sulfuric acid solution. This material was pelletized and dried at 100° C. in air substantially saturated with water vapor for several hours. The initial white color remained and no heat was evolved during pelletization.

EXAMPLE 8

The dried, white pellets from Example 2 were calcined to a maximum temperature of 550° C. in a flowing dried air atmosphere. The catalyst, examined using n-pentane feedstock, provided a product with 0.38 i-$C_5/\Sigma$ $C_5$ isomer ratio and 98.5% selectivity to isopentane. The reaction conditions were: Pressure=450 psig, LHSV=1.00 hr$^{-1}$, $H_2/C_5$=1.81, and Cat. Vol=20.0 cc.

EXAMPLE 9

The dried, dark gray pellets from Example 3 were calcined to a maximum temperature of 550° C. in a flowing dried air atmosphere. The catalyst, examined using n-pentane feedstock, provided a product with 0.65 i-$C_5/\Sigma$ $C_5$ isomer ratio and 99.1% selectivity to isopentane. The reaction conditions were the same as in Example 8.

EXAMPLE 10

The dried, white pellets from Example 5 were calcined to a maximum temperature of 550° C. in a flowing dried air atmosphere. The hydrocracking performance was examined using normal heptane feedstock. The catalyst provided 53% conversion and 86% selectivity to cracked products. The reaction conditions were: Pressure=800 psig, LHSV=2.00 hr$^{-1}$, $H_2/C_7$=10.0 and Cat. Vol=20.0 cc.

EXAMPLE 11

The dried, dark pellets from Example 6 were calcined to a maximum temperature of 550° C. in a flowing dried air atmosphere. The hydrocracking performance was examined under the same conditions as Example 10. The catalyst provided 71% conversion of heptane and 91% selectivity to cracked products.

SUMMARY OF EXAMPLES

Example 1

The chemical reaction of the present invention does not occur in the absence of a supported metal. This indicates an involvement of the metal complex—not simply a reaction between the formic acid and mordenite and/or boehmite.

Example 2

The initial light color is maintained in an ammonia atmosphere. Since the metal is initially present as an amine complex ($Pd(NH_3)_4^{2+}$ =light color), the added presence of ammonia would reasonably favor maintaining this light amine complex. This example shows that if the amine complex was sustained, the color would not change.

Example 3

The dark color occurs in a water atmosphere. The result indicates that the darker color is probably due to a metal aquo complex, i.e. $Pd(H_2O)_4^{2+}$.

Example 4

This example is direct evidence that the original metal complex ($Pd(NH_3)_4^{2+}$) is altered by drying in the presence of formic acid and a water vapor atmosphere.

Example 5

This example is like Example 2. It shows that both palladium and rhodium amine complexes are unchanged in an ammonia atmosphere.

Example 6

This example is like Example 3. It shows that both palladium and rhodium amine complexes are altered in a water vapor atmosphere. The slower formation of the tan color again shows that the chemical reaction involves the supported metal, i.e. rhodium.

Example 7

This example demonstrates the importance of the acid. The reaction of the present invention occurs in the presence of mild organic acids (formic acid) but does not occur in the presence of strong mineral acids ($H_2SO_4$).

Example 8

The isomerization activity of the white-$Pd(NH_3)_4^{2+}$-catalyst was determined.

Example 9

The improved isomerization activity of the present invention catalyst is demonostrated.

Example 10

The hydrocracking activity of the white $Rh(NH_3)_5^{3+}$+$Pd(NH_3)_4^{2+}$-catalyst was determined.

Example 11

The improved hydrocracking activity of the present invention palladium and rhodium catalyst is demonstrated.

In the above examples water was supplied to the air in a static atmosphere in a drying oven to raise the humidity to just below saturation. Obviously the humidity or water partial pressure is not critical so long as it is above the equilibrium partial pressure of water, at drying temperature, for the aquo complexes which are believed to be formed. Water contents as low as 30,000 ppm may be employed to achieve the desired improved catalyst.

What is claimed is:

1. A catalyst for the conversion of hydrocarbons, said catalyst comprising one or more platinum-group metals supported on a crystalline alumino-silicate, and said catalyst being prepared by drying in an atmosphere containing water vapor at low temperatures and in the presence of a mild organic acid during periods after incorporation of the metal into the zeolite and prior to the catalytic reaction, whereby an aquo complex of the platinum group metal is formed.

2. A catalyst for the conversion of hydrocarbons, said catalyst comprising one or more platinum group metals supported on a crystalline alumino-silicate zeolite, and said catalyst being prepared, after impregnation in an aqueous solution containing ions of said one or more platinum group metals, by drying in an atmosphere containing at least 30,000 ppm of water, at a temperature of between 25° and 200° C.

3. A catalyst as in claims 1 and 2 in which the alumino-silicate is mordenite.

4. The catalyst of claim 3 in which the platinum group metals are present in the amount of 0.01 to 6% by weight and are selected from the group consisting of palladium and rhodium and mixtures thereof.

5. The catalyst of any of claims 1-4, formed by calcination of the dried product recited therein followed by reduction by hydrogen.

* * * * *